(12) United States Patent
Juneja et al.

(10) Patent No.: US 10,137,902 B2
(45) Date of Patent: Nov. 27, 2018

(54) ADAPTIVE INTERACTIVE VOICE SYSTEM

(71) Applicant: Harman International Industries, Inc., Stamford, CT (US)

(72) Inventors: Ajay Juneja, Mountain View, CA (US); Stefan Marti, Oakland, CA (US); Davide Di Censo, San Mateo, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 30 days.

(21) Appl. No.: 14/620,742

(22) Filed: Feb. 12, 2015

(65) Prior Publication Data

US 2016/0236690 A1 Aug. 18, 2016

(51) Int. Cl.
*B60W 40/09* (2012.01)
*B60W 50/14* (2012.01)
(Continued)

(52) U.S. Cl.
CPC ............ *B60W 40/09* (2013.01); *B60W 50/14* (2013.01); *G01C 21/3629* (2013.01);
(Continued)

(58) Field of Classification Search
CPC ......... B60W 40/09; B60W 2040/0818; B60W 2040/0872; B60W 2040/089;
(Continued)

(56) References Cited

U.S. PATENT DOCUMENTS 7,092,928 B1* 8/2006 Elad .................... G06F 17/3089
704/260
8,106,756 B2* 1/2012 Yoon .................... B60W 40/09
340/439
(Continued)

FOREIGN PATENT DOCUMENTS

EP 1914106 A2 4/2008

OTHER PUBLICATIONS http://grammar.about.com/od/rs.g/soundsymbolismterm.htm, "Sound Symbolism (Definition and Examples)", Jan. 30, 2012, 5 pages.
(Continued)

*Primary Examiner* — Qutbuddin Ghulamali
(74) *Attorney, Agent, or Firm* — Artegis Law Group, LLP

(57) ABSTRACT

In one embodiment, an apparatus for adaptively interacting with a driver via voice interaction is provided. The apparatus includes a computational models block and an adaptive interactive voice system. The computational models block is configured to receive driver related parameters, vehicle related parameters, and vehicle environment parameters from a plurality of sensors. The computational models block is further configured to generate a driver state model based on the driver related parameters and to generate a vehicle state model based on the vehicle related parameter. The computational models block is further configured to generate a vehicle environment state model based on the vehicle environment parameters. The adaptive interactive voice system is configured to generate a voice output based on a driver's situation and context as indicated on information
(Continued)

included within at least one of the driver state model, the vehicle state model, and the vehicle environment state model.

20 Claims, 6 Drawing Sheets

(51) Int. Cl.
*G01C 21/36* (2006.01)
*G10L 13/04* (2013.01)
*G06F 3/16* (2006.01)
*G08G 1/0962* (2006.01)
*G10L 25/63* (2013.01)
*B60R 16/037* (2006.01)
*G08G 1/0968* (2006.01)
*B60W 40/08* (2012.01)

(52) U.S. Cl.
CPC ........... *G01C 21/3661* (2013.01); *G06F 3/16* (2013.01); *G08G 1/0962* (2013.01); *G10L 13/04* (2013.01); *B60R 16/0373* (2013.01); *B60W 2040/089* (2013.01); *B60W 2040/0818* (2013.01); *B60W 2040/0872* (2013.01); *B60W 2540/02* (2013.01); *B60W 2540/10* (2013.01); *B60W 2540/12* (2013.01); *B60W 2540/14* (2013.01); *B60W 2540/16* (2013.01); *B60W 2540/22* (2013.01); *B60Y 2302/09* (2013.01); *G08G 1/096872* (2013.01); *G08G 1/096894* (2013.01); *G10L 25/63* (2013.01)

(58) Field of Classification Search
CPC ......... B60W 2540/02; B60W 2540/10; B60W 2540/12; B60W 2540/14; B60W 2540/16; B60W 2540/22; B60R 16/0373; B60Y 2302/09; G01C 21/3629; G08G 1/096872
USPC ......................................................... 340/576
See application file for complete search history.

(56) References Cited

U.S. PATENT DOCUMENTS

| | | | |
|---|---|---|---|
| 9,007,198 B2* | 4/2015 | Gunaratne | G08G 1/163 340/439 |
| 2002/0091473 A1* | 7/2002 | Gardner | G07C 5/0808 701/32.7 |
| 2002/0120374 A1 | 8/2002 | Douros et al. | |
| 2005/0128106 A1 | 6/2005 | Nakaishi et al. | |
| 2006/0190169 A1 | 8/2006 | Kawai | |
| 2008/0065293 A1 | 3/2008 | Placke et al. | |
| 2008/0269958 A1* | 10/2008 | Filev | B60W 50/10 701/1 |
| 2009/0040054 A1* | 2/2009 | Wang | B60W 30/095 340/576 |
| 2013/0131905 A1 | 5/2013 | Green et al. | |

OTHER PUBLICATIONS

Extended European Search Report Application No. 16 15 3988, dated Apr. 18, 2016, 7 pages.

* cited by examiner

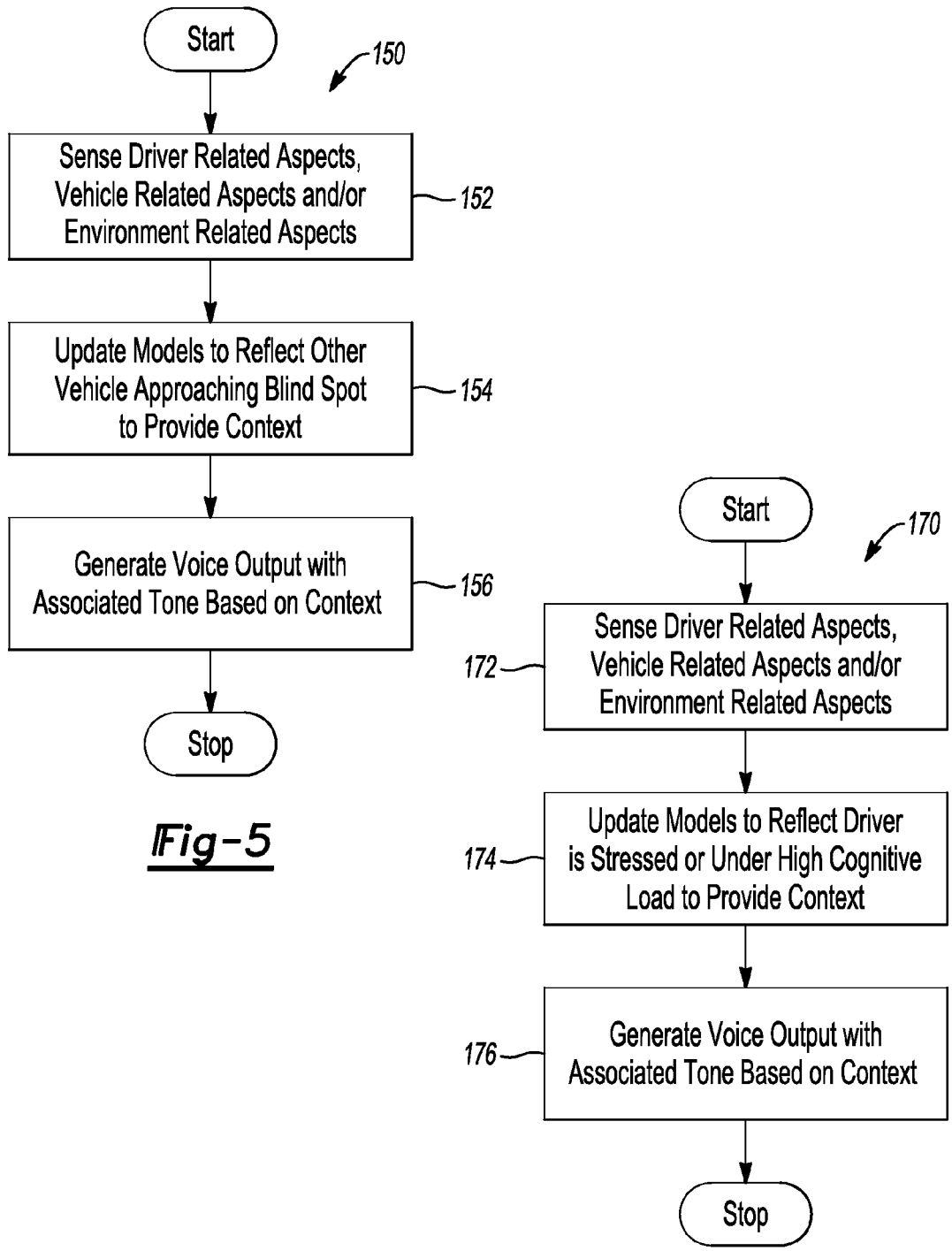

ADAPTIVE INTERACTIVE VOICE SYSTEM

TECHNICAL FIELD

Aspects as disclosed herein generally relate to an adaptive interactive voice system.

BACKGROUND

Conventional voice interaction systems may interrupt a user in a conversation which is considered inappropriate among human being. In other situations, voice interaction systems may speak (or provide a voice output) during a busy driving situation. Essentially, such voice interaction systems speak when it is not desirable, or when they are not supposed to, or in a completely inappropriate tone. In the automotive setting, such "inconsiderate behavior" of the voice interaction system leads to drivers turning these systems off, or ignoring the output prompts as they are not context relevant. Furthermore, such voice interaction systems appear robotic, artificial (or non-human), and are therefore not enjoyable and artificial. This is unfortunate as voice interaction systems are created to mimic human to human interaction, but they are unsuccessful at it.

Conventional voice interaction systems may not adjust to the user's context. For example, a voice interaction system in a vehicle does not change it tone or withholds speaking altogether if the driver is in a busy driving situation. In conventional voice interaction systems, the same voice (speech, rate, tone, etc.) is used across all voice interaction use cases, and is generally the same for both unimportant and important audio output information to the user and is also the same for timely and not so timely information, etc. Moreover, conventional voice interaction systems are not context aware, therefore such systems do not understand when to interject in the conversation that the driver may be having with a passenger or when to avoid disturbing the conversation.

SUMMARY

In one embodiment, an apparatus for adaptively interacting with a driver via voice interaction is provided. The apparatus includes a computational models block and an adaptive interactive voice system. The computational models block is configured to receive driver related parameters, vehicle related parameters, and vehicle environment parameters from a plurality of sensors. The computational models block is further configured to generate a driver state model based on the driver related parameters and to generate a vehicle state model based on the vehicle related parameter. The computational models block is further configured to generate a vehicle environment state model based on the vehicle environment parameters. The adaptive interactive voice system is configured to generate a voice output based on a driver's situation and context as indicated on information included within at least one of the driver state model, the vehicle state model, and the vehicle environment state model.

In another embodiment, a computer-program product embodied in a non-transitory computer readable medium that is programmed for adaptively interacting with a user via voice interaction is provided. The computer-program product includes instructions to receive driver related parameters, vehicle related parameters, and vehicle environment parameters from a plurality of sensors. The computer-program product further includes instructions to generate a driver state model based on the driver related parameters and to generate a vehicle state model based on the vehicle relate parameters. The computer-program product further includes instructions to generate a vehicle environment state model based on the vehicle environment parameters. The computer-program product further includes instructions to provide a voice output based on a driver's situation and context as indicated on information included within at least one of the driver state model, the vehicle state model, and the vehicle environment state model.

In another embodiment, an apparatus for adaptively interacting with a driver via voice interaction is provided. The apparatus includes a computational models block and an adaptive interactive voice system. The computational models block is programmed to receive driver related parameters, vehicle related parameters, and vehicle environment parameters from a plurality of sensors. The computational models block is further programmed to generate a driver state model based on the driver related parameters and to generate a vehicle state model based on the vehicle related parameter. The computational models block is further programmed to generate a vehicle environment state model based on the vehicle environment parameters. The adaptive interactive voice system is further programmed to refrain from generating the voice output to prevent driver distraction in response to information included within at least one of the driver state model, the vehicle state model, and the vehicle environment state model indicating that the driver is experiencing a high cognitive load.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 5 depicts a third use case that monitors driver related aspects, vehicle related aspects and environment aspects and that generates the voice output to the driver based on monitored aspects in accordance to one embodiment to one embodiment;

FIG. 6 depicts a fourth use case that monitors driver related aspects, vehicle related aspects and environment aspects and that generates the voice output to the driver based on monitored aspects in accordance to one embodiment to one embodiment;

DETAILED DESCRIPTION

Figure 1:
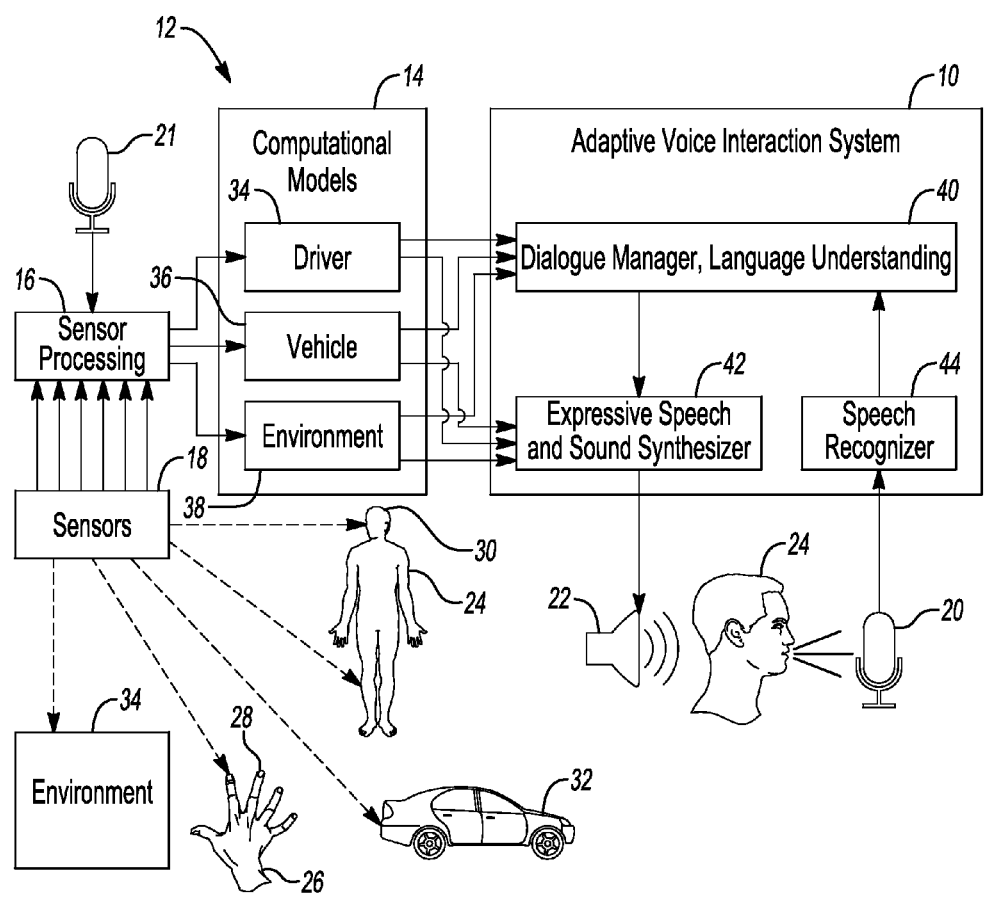
FIG. 1 depicts an adaptive interactive voice system in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

In general, the present disclosure generally relates to spoken dialogue systems, adaptive systems, context awareness systems, emotionally expressive speech synthesis, and auditory alerting. The present disclosure provides a driver of a vehicle with an adaptive interaction system that is able to adjust voice interaction to the driver's situation and context. This includes, but not limited to, withholding responses in time of high cognitive load, and flexibility of varying a tone of voice to communicate different conditions.

Aspects of the present disclosure may make driving safer by providing a helpful safety feature in which different types of voice interactions are associated with different voice tones so that the driver is able to identify the significance and timeliness of information faster. In addition, various aspects of the present disclosure add to an enjoyable experience as the use of a variety of voice tones build a more exciting and engaging experience for the driver that resembles human to human interaction. Further, aspects of the present disclosure may improve the driving ability since the situation and context aware system lowers the cognitive load of the driver by being sensitive (or in-tune) with the driver's state as well as the vehicle an external situations.

FIG. 1 depicts an apparatus including an adaptive interactive voice system 10 (hereafter "system 10") that is positioned in a vehicle 12. The system 10 includes any number of electrical devices positioned thereon to execute instructions for performing operations as noted herein. It is recognized that the apparatus may be used in connection with any transportation medium such as an automobile, motorcycle, aircraft, or watercraft, etc. The apparatus also includes a computational models block (or circuit) 14, a sensor processing block (or circuit) 16, and a plurality of sensors 18. In general, the system 10 is configured to adjust voice interaction with a driver 24 of the vehicle 12 based on the driver's 24 situation and context. The voice interaction between the driver 24 and the system 10 is facilitated through the use of microphones 20, 21 and a speaker 22. For example, each microphone 20, 21 receives an incoming audio signal from the driver 24 and provides the incoming audio signal to the system 10 for processing. The speaker 22 transmits a voice output to the driver 24 based on information provided by the system 10.

The system 10 is configured to assess the driver's 24 cognitive load and may avoid interfacing with the driver 24 when the driver 24 is detected to be under a high cognitive load. Additionally, the system 10 may also flexibly vary its tone of the outgoing audio output to communicate to the driver 24 under different conditions. These conditions are generally based on sensed parameters which relate to the driver 24, the vehicle 12 and environment.

The plurality of sensors 18 are generally configured to sense various aspects related to the driver 24 such as his/her hands 26 (e.g., hand gestures), fingers 28 (e.g., finger gestures), head 30, eye gaze, facial expression, voice tone, etc. In particular, the plurality of sensors 18 generally includes the microphones 20, 21. For example, each microphone 20, 21 may receive a voice input from the driver 24 and provide this information to the sensor processing block 16 to determine (i) when the driver is engaged in conversation (e.g., detecting a conversational turn taking conversation such as the driver 24 engaged in a passenger conversation or the driver 24 is speaking right now) and (ii) when the driver 24 is under stress or to monitor the emotional state and level of alertness of the driver 24.

The plurality of sensors 18 may also include a red/blue/green (RBG) imager, a depth sensor, an infrared corneal reflection sensor, and a temperature and grip force sensors. The RBG imager provides information to the sensor processing block 16 that corresponds to head position and orientation of the driver 24. The depth sensor provides information to the sensor processing block 16 that corresponds to finger and head gestures. The IR corneal reflection sensor is generally used along with the sensor processing block 16 to track eye gaze of the driver eye.

In addition, the plurality of sensors 18 may also sense various vehicle related parameters 32 such a throttle position, clutch, gear selection (e.g., transmission status (Park, Reverse, Neutral, Drive, Low)), brake pedal, steering wheel angle, etc. The plurality of sensors 18 transmit information corresponding to the above vehicle related parameters 32 to the sensor processing block 16 for processing. The sensors 18 may also include global position system (GPS) related mechanisms or other location sensor to provide GPS coordinates for the vehicle 12. The sensors 18 may also include inertial and magnetic sensors for providing vehicle orientation and dynamic information. The plurality of sensors 18 transmit information corresponding to the vehicle location, orientation, and dynamic information to the sensor processing block 16 for processing.

The plurality of sensors 18 are configured to sense the environment exterior to vehicle 12 such as stationary and moving objects with one or more of depth sensors that are based on time of flight, laser, etc. (object detection and scene analysis), RGB sensors (or cameras) (e.g., for object recognition), thermal/motion sensors (e.g., for pedestrian detection), and radar/lidar sensors (e.g., low visibility sensing and obstacle recognition, etc.). The plurality of sensors 18 transmit information corresponding to the environment to the sensor processing block 16 for processing. The plurality of sensors 18 may also include virtual sensors for providing information corresponding additional environmental aspects such as local weather, traffic, etc. to the sensor processing block 16 for processing.

The sensor processing block 16 provides information received from the plurality of sensors 18 to the computational models block 14. The computational models block 14 employs modeling software with instructions that are executed on any number of electrical devices (not shown) positioned thereon to create and continually update various models of (i) a driver state 34 based on sensed information of the driver 24, (ii) a vehicle state 36 based on sensed information of the vehicle 12, and (iii) an environment state 38 based on sensed environmental information.

For example, models of the driver state 34 may include physiological, cognitive, and/or affective state (e.g., cognitive load, stress level, alertness, and emotional state). These factors are based on the sensed information which relate to the driver 24 such as the conversational setting of the driver 24; head position, orientation, and facial features of the driver 24; finger and hand gestures of the driver 24; eye gaze of the driver 24, and temperature and grip force on the steering wheel (e.g., stress level) of the driver 24.

The various models of the vehicle state 36 may include maximum available vehicle performance (e.g., taking into account vehicle maintenance level, tire condition, available grip, and shock condition). The models of the vehicle state 36 may also include aspects detected by the plurality of sensors 18 such as, but not limited to, any one of: throttle position, clutch position, gear selection, brake pedal, etc. The various models of the environment state 38 generally include aspects which relate to the exterior environment to the vehicle 12 such weather and/or objects in proximity of the vehicle 12. These objects may include vehicles, trees, lane indicators, freeway barriers, etc.

The system 10 generally includes a dialogue manager block 40, an expressive speech and synthesizer block 42, and a speech recognizer block 44. The system 10 utilizes signal processing techniques such as microphone echo cancellation and beam forming for directional signal transmission or reception in connection with the microphones 20, 21 and the speaker 22. While not illustrated, microphone arrays and amplifier(s) may be provided with the system 10.

The dialogue manager block 40 is generally configured to determine which dialogue to engage with the driver 24. For example, the dialogue manager block 40 may initiate voice interaction with the driver 24 which relate to climate control selection, audio selection, and safety warnings as dictated based on the models of the driver state 34, the vehicle state 36, and the environment state 38. The dialogue manager block 40 is configured to generate speech interaction with various levels of verbosity/terseness (e.g., verbose may be "There is a traffic jam coming up in 2 miles, you may want to slow down"; terse may be "Traffic jam! Slow down!"), formality/informality (e.g., a formal speech phrase would be "Please be aware that there is a left turn coming up at the next intersection!" whereas informal speech phrase may be: "Heads up: turn left at next intersection!"), and higher level language features such as cultural affiliation of the synthesized voice (e.g., the generated dialogue may follow language conventions which are specific to a cultural or ethnic population).

The speech and sound synthesizer block 42 is configured to generate voice responses that, although having the same or similar semantic content, can vary based on various speech levels, such as (i) overall tempo, loudness, and pitch of the synthesized voice, (ii) vocal affect parameters which will be explained in more detail below, (iii) non-verbal and non-language vocalizations, paralinguistic respiration (e.g., laugh, cough, whistles, etc.), and (iv) non-speech altering sounds (e.g., beeps, chirps, clicks, etc.). These voice responses vary in their perceived emotional effect, e.g., the same semantic content can be rendered with speech which appears soft and sweeping to the user, or rash and abrupt. These variations in perceived emotional effect may be generated by using words with soft vs. hard sounds, and polysyllabic vs. abrupt rhythms. For example, sounds such as 'l,' 'm,' and 'n,' and long vowels or diphthongs, reinforced by a gentle polysyllabic rhythm, are interpreted as 'nicer' than words with hard sounds such as 'g' and 'k,' short vowels, and an abrupt rhythm. The field of Sound Symbolism (as described in, for example, http://grammarabout.com/od/rs/g/soundsymbolismterm.htm) provides a variety of heuristics which attempt to instill affect by connecting particular sound sequences with particular meanings in speech.

The vocal affect parameters as noted above generally include (i) pitch parameters (e.g., accent shape, average pitch, contour slope, final lowering, and pitch range), (ii) timing parameters (e.g., speech rate and stress frequency) (iii) voice quality parameters (e.g., breathiness, brilliance, laryngealization, loudness, pause discontinuity, and pitch continuity), and (iv) articulation parameters. The speech recognizer 44 is configured to receive/understand the voice of the driver 24.

In the event additional adaptive interactive systems are present with the system 10 (e.g., when a portable communication device is present such as a cell phone, etc. and is connected to a head unit that is also equipped with a voice interaction system), the system 10 is configured to arbitrate, prioritize, and emphasize the additional adaptive interactive systems and transmit a command to suppress the additional adaptive interactive system to prevent the driver 24 from being confused (e.g., multiple systems providing voice information to the driver 24) by multiple voice prompts/conversations.

In general, the system 10 is configured to use the information sensed at the plurality of sensors 18 and processed by the sensor processing block 16 to create and continuously update models of (i) a driver state 34 (e.g., physiological, cognitive and affective aspects (or cognitive load, stress level, alertness, and emotional state), (ii) a vehicle state 36 (e.g., maximum available vehicle performance, etc.), and (iii) an environment 38 (e.g., objects in proximity to the vehicle 12 or in the way of the vehicle 12). The dialogue manager block 40 is configured to use the model of the driver state 34, the model of the vehicle state 36, and the model of the environment 38 to adapt the type and tone of the voice output based on the type of interaction (e.g., general information, navigation instruction, imminent danger alert, etc.). It is recognized that the voice output may also include, other than audible speech, non-linguistic vocalizations such as laughter, breathing, hesitation (e.g., "uhm"), and/or non-verbal consent (e.g., "aha"). In general, the speech synthesizer 42 may vary the voice tone to allow the voice output to be more expressive, and more context relevant.

For example, the dialogue manager block 40 may provide (i) basic directions and suggestions that are provided in a normal tone (e.g., medium volume, medium speed) of voice and (ii) safety warnings that are given in a different tone of voice based on the nearness of the danger (e.g., louder as they are closer), possibly mixed with warning tones (beeps) appropriate to the warning condition, and (iii) other types of information that can be communicated with specific voice tones that allow the driver to associate the type of information with a specific voice tone type. It is recognized that the system 10 may use the generated models of the driver state 36, the vehicle state 38, and the environment state 38 to determine if it is appropriate to interact with the driver 24 in the present moment or if it is preferable to withhold the voice interaction until a high cognitive load situation has passed. In general, the dialogue manager block 40 creates the semantic level (essentially, the text strings) of the voice response for the system 10, and then transmits the text string to the speech synthesizer block 42. The dialogue manager block 40 tells the speech synthesizer block 42 what to say. At the same time (in parallel to that), the dialogue manager block 40 instructs the speech synthesizer block 42 on how to render the specific text strings with lower level affective attributes such as voice tone, voice type, etc. In short, the dialogue manager block 40 creates the response, both what and how, but the speech synthesizer block 42 renders the response based on the instructions from the dialogue manager block 40.

Figure 2:
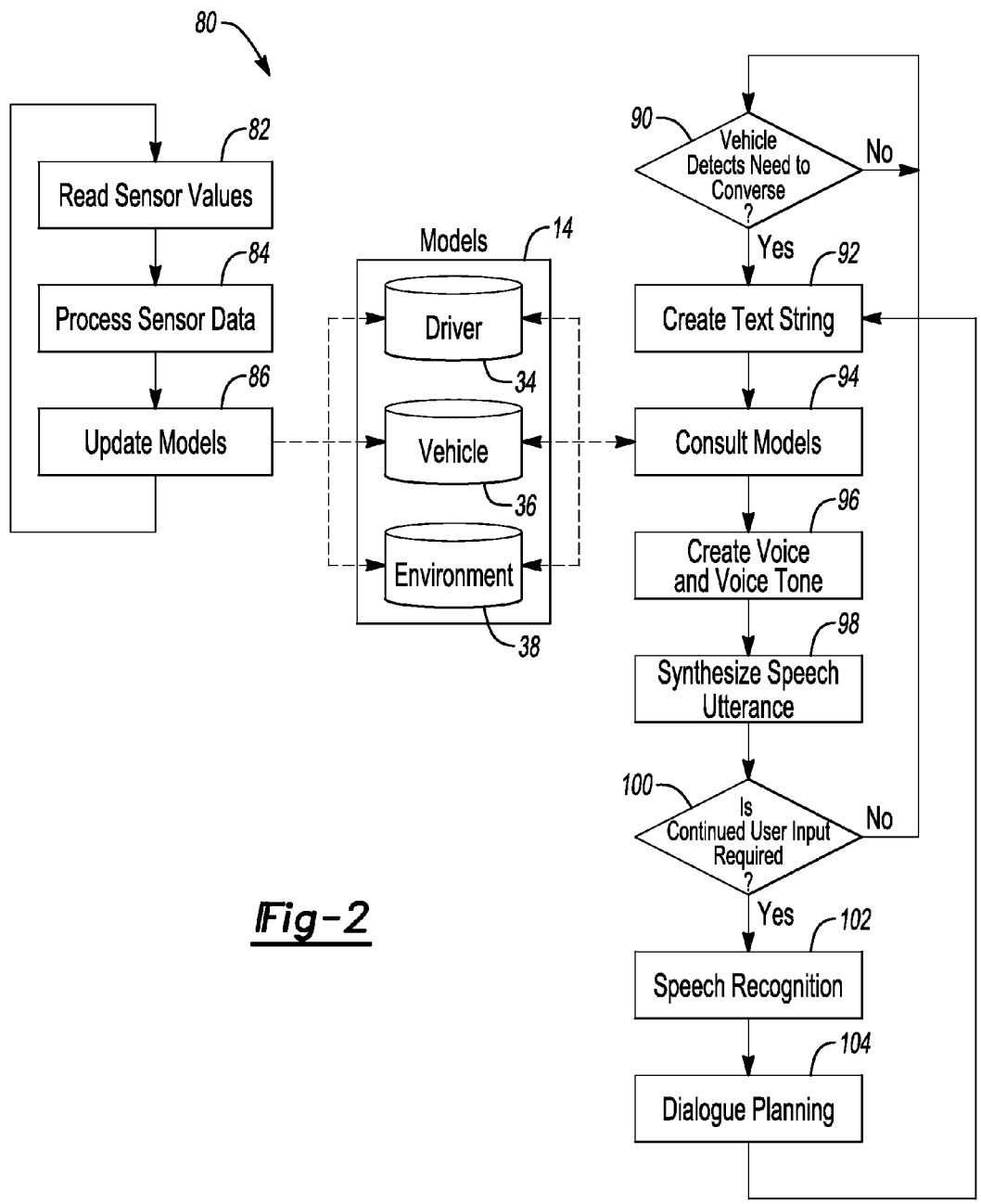
FIG. 2 depicts a method for monitoring a response and for adjusting a voice output to a driver based on the response in accordance to one embodiment.

FIG. 2 depicts a method 80 for adaptive voice interaction with the driver 24 in accordance to one embodiment.

In general, operations 82, 84, and 86 are executed in parallel with operations 90, 92, 94, 96, 98, 100, 102, and 104. Operations 82, 84, and 86 are independent of operations 90, 92, 94, 96, 98, 100, 102, and 104.

In operations 82 and 84, the plurality of sensors 18 monitor or sense driver related aspects, vehicle related aspects, and environment related aspects and the sensor processing block 16 processes the sensed information. For example, the sensed and processed driver related aspects may include hand/fingers gestures; head position and head orientation; eye gaze; facial expression for measuring stress and the emotional state; voice tone for measuring stress, emotional state and level of alertness, whether the driver is engaged in conversation (e.g., detecting a conversational turn taking conversation such as the driver engage in a passenger conversation or the driver is speaking right now).

The sensed and processed vehicle related aspects may include vehicle speed, the position of the throttle, clutch and/or brake pedal; gear selection (or transmission status); steering wheel angle; location of the vehicle 12 (e.g., via GPS coordinates); orientation and vehicle dynamic information for the vehicle 12. The sensed and processed environment related aspects may include the detection of stationary and moving objects with respect to the vehicle 12, the detection of pedestrians around the vehicle 12, low visibility conditions about the vehicle 12 in addition to the local weather, traffic, etc. that is being experienced by the vehicle 12. It is recognized that the sensed driver related aspects, the sensed vehicle related aspects, and the sensed environment related aspects change dynamically, so such aspects are updated dynamically by the computational models block 14.

In operation 86, the computational models block 14 continuously updates the models for the driver state 34, the vehicle state 36, and the environment state 38 in response to the sensed driver related aspects, the sensed vehicle related aspects, and the sensed environment related aspects.

In operation 90, the system 10 determines whether there is a need to converse with the driver 24. If this condition is true, then the method 80 proceeds to operation 92. For example, the system 10 may receive a voice input from the driver 24 and transmit outgoing data in the form of the voice output to the driver 24 to the voice input. The system 10 may also provide the voice output to the driver 24 based on the need to communicate a warning or notification of an event of interest to the driver 24.

In operation 92, the system 10 generates an initial text string to provide to the driver 24 in the form of the voice output.

In operation 94, the system 10 consults with computational models block 14 to assess the current state of the sensed driver related objects, the sensed vehicle related objects, and the sensed environment related aspects to determine context awareness (e.g., the driver's cognitive load, present vehicle 12 conditions, and environment surrounding the vehicle 12).

In operation 96, the dialogue manager block 40 determines the voice output and corresponding tone to provide to the driver 24 in response to determining the context awareness as set forth in operation 94.

In operation 98, the system 10 (or the speech synthesizer block 42) generates a speech utterance (e.g., the voice output and corresponding tone) and transmits the same to the driver 24 via the speaker 22. In other words, the system 10 audibly transmits the voice output and corresponding tone to the driver 24.

In operation 100, the system 10 again determines whether there is a need to continue to converse with the driver 24. If this condition is true, then the method 80 moves to operation 102. If not, the method 80 moves back to operation 92.

In operation 102, the system 10 (e.g., the speech recognizer 44) receives the voice input from the driver 24 via the microphone 20. The speech recognizer 44 monitors the voice input from the driver 24 to monitor the stress level of the driver 24.

In operation 104, the system 10 (e.g., the dialogue manager block 40) plans the next part of the dialogue. For example, the dialogue manager block 40 may determine the applicable text string to provide in response to the voice input received from the driver 24. The text string may be related to a topic or subject matter raised in the voice input (e.g., response to a request to change temperature, response to a request to identify the current radio station setting of the vehicle, response to a request to change radio station setting, etc.). The method 80 then moves to operation 90 for execution.

In general, the method 80 starts talking to the driver 24 first (e.g., see operation 96) for various reasons (e.g., see operation 90). After the method 80 (or system 10) has rendered a voice output (e.g., see operation 98), the method 80 (or system 10) will decide whether it is necessary to listen if the driver 24 is expected to respond (e.g., see operation 102). If so, the exchange becomes an actual dialogue (or loop).

For purposes of simplification, the system 10 (and method 80) talks to the driver 24, and if the system 10 (and method 80) needs to respond to the driver 24, the system 10 (and method 80) waits for the driver's voice (see operation 102). Based on what the driver 24 said, the system plans the next part of the dialogue. It is recognized that the speech recognizer 44 (and microphone 20) perform speech recognition. The microphone 21 performs voice tone recognition in parallel. It is further recognized that the microphone 21 irrespective of whom the driver 24 is talking to (e.g., driver 24 on the phone, driver 24 talking to a passenger, etc.) analyzes the voice tone. This type of listening is not speech recognition, but voice tone recognition. As part of the voice tone recognition, the microphone 20 and/or the sensor processing block 16 is used to recognize the driver's emotional state from prosody, etc. This means that the microphone 20 and/or the sensor processing block 16 would not only recognize what is being said, but also how what is being said is rendered or perceived.

Figure 3:
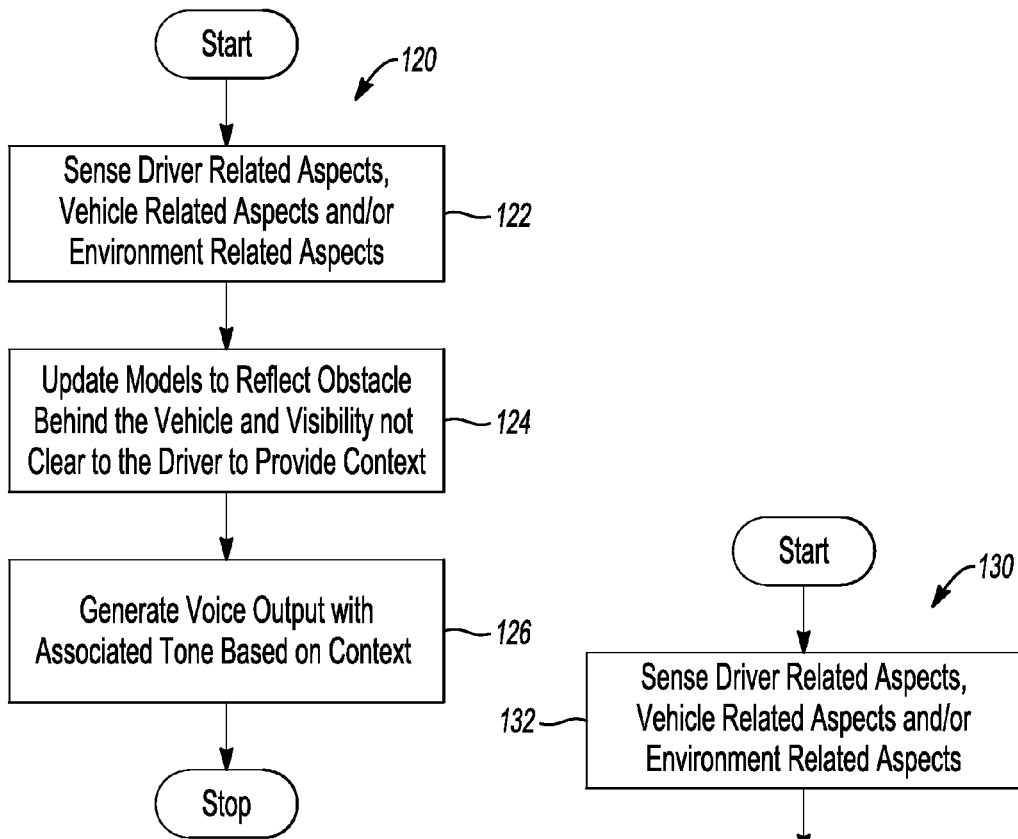
FIG. 3 depicts a first use case that monitors driver related aspects, vehicle related aspects and environment aspects and that generates a voice output to a driver based on monitored aspects in accordance to one embodiment to one embodiment.

FIG. 3 depicts a first use case 120 that monitors driver related aspects, vehicle related aspects, and environment aspects and that generates the voice output to the driver based on monitored aspects in accordance to one embodiment. The first use case 120 generally corresponds to the scenario in which the driver 24 is backing out of a parking spot, but there is a child positioned behind the vehicle 12 on a bicycle which is not clearly visible to the driver 24.

In operation 122, the plurality of sensors 18 monitor driver related aspects, vehicle related aspects, and/or environment aspects and the sensor processing block 16 process such information. For example, the plurality of sensors 18 may (i) detect the presence of the child positioned at the rear of the vehicle via a rearward pointing camera (or any other type of sensor, such as thermal, motion sensor, acoustic sensor, etc.); (ii) detect that visibility conditions may not be clear based on weather information or visibility sensors on the car; and (iii) determine that a closing vehicle speed is not decreasing in reference to the location of the child at the rear of the vehicle 12.

In operation 124, the computational models block 14 receives the processed information from the sensor processing block 16 that (i) an object is positioned at the rear of the vehicle; (ii) visibility conditions are not clear based on weather information, and (iii) the closing speed of the vehicle is not decreasing in reference to the position of the object with respect to the vehicle 12. The computational models block 14 will reflect the above conditions and provide this context to the system 10

In operation 126, the system 10 receives the context from the computational models block 14 and generates the voice output in a very firm, somewhat loud tone that there is an obstacle positioned behind the driver 24.

Figure 4:
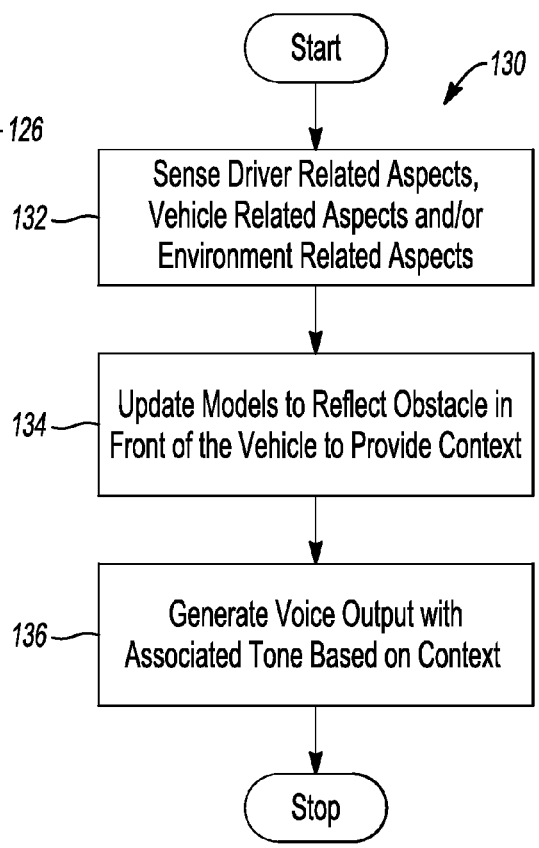
FIG. 4 depicts a second use case that monitors driver related aspects, vehicle related aspects and environment aspects and that generates the voice output to the driver based on monitored aspects in accordance to one embodiment to one embodiment.

FIG. 4 depicts a second use case 130 that monitors driver related aspects, vehicle related aspects, and/or environment aspects and that generates the voice output to the driver based on monitored aspects in accordance to one embodiment. The second use case 130 generally corresponds to the scenario in which the driver 24 is driving out of a driveway at a relatively fast speed and that the driveway is surrounded by trees that hide the view to the main road. It in this case, it is necessary for the system 10 to instruct the driver 24 to slow down.

In operation 132, the plurality of sensors 18 monitor driver related aspects, vehicle related aspects, and/or environment aspects and the sensor processing block 16 process such information. For example, the plurality of sensors 18 (i) detect the presence of the trees around the vehicle 12 with rearward and forward pointing cameras (or the lidar sensor) and (ii) monitor the speed and direction/orientation of the vehicle 12 as the vehicle moves through the driveway.

In operation 134, the computational models block 14 receives the processed information from the sensor processing block 16 that (i) trees are positioned around the vehicle 12 and (ii) the speed and orientation of the vehicle 12. The computational models block 14 will reflect the above conditions and provide this context to the system 24.

In operation 136, the system 10 receives the context from the computational models block 14 and generates the voice output to the driver 24 to instruct the driver 24 to slow down as the driver 24 moves down the driveway.

Alternatively, this the second use case 130 may also include the scenario in which the one or more of the plurality of sensors 18 determine if the main road is clear (e.g., sensors that can see through the trees, such as motion sensors, or has access to sensors in the main road which provide information to the vehicle 12). In this case, the vehicle 12 can determine if the driver 24 can proceed or not. For example, the system 10 may provide the voice output "It is safe to move" to the driver 24 when the main road is clear.

FIG. 5 depicts a third use case 150 that monitors driver related aspects, vehicle related aspects, and/or environment aspects and that generates the voice output to the driver 24 based on monitored aspects in accordance to one embodiment. The third use case 150 generally corresponds to the scenario in which the driver 24 is attempting to switch a lane and there is another vehicle that is also merging into the same lane. In this case, it is necessary to notify the driver 24 when it is unsafe to make the lane change and to notify the driver 24 when it is safe to make the lane change.

In operation 152, the plurality of sensors 18 monitor driver related aspects, vehicle related aspects, and/or environment aspects and the sensor processing block 16 process such information. For example, the plurality of sensors 18 (i) detect that the vehicle 12 intends to make a lane change and (ii) detect that another vehicle 12 has merged into the lane that the vehicle 12 intends to change into.

In operation 154, the computational models block 14 receives the processed information from the sensor processing block 16 that (i) the vehicle 12 intends to make a lane change and (ii) another vehicle 12 has merged into the lane that the vehicle 12 intends to change into. The computational models block 14 will reflect the above conditions and provide this context to the system 10.

In operation 156, the system 10 receives the context from the computational models block 14 and generates the voice output in a loud and dangerous sounding tone that it is not safe to move into the lane and subsequently generates the voice output in a pleasant sounding tone when it is safe to move into the lane.

FIG. 6 depicts a fourth use case 170 that monitors driver related aspects, vehicle related aspects, and/or environment aspects and that generates the voice output to the driver 24 based on monitored aspects in accordance to one embodiment. The fourth use case 170 generally corresponds to the scenario in which the hands 26 of the driver 24 are getting sweaty, which indicate that the driver 24 is stressed or under a high cognitive load. In this case, the system 10 refrains from generating and transmitting the voice output to the driver 24.

In operation 172, the plurality of sensors 18 monitor driver related aspects, vehicle related aspects, and/or environment aspects and the sensor processing block 16 process such information. For example, the plurality of sensors 18 (e.g., temperature, grip force sensors, and galvanic skin response sensors on the steering wheel) detect that the hands 26 of the driver 24 exceed a predefined temperature, the force used by the driver 24 to grip the steering wheel exceeds a predefined force level, and/or the driver's hands are more conductive than normal, i.e., are sweaty.

In operation 174, the computational models block 14 receives the processed information from the sensor processing block 16 that the hands 26 of the driver 24 exceed the predefined temperature, the force used by the driver 24 to grip the steering wheel exceeds the predefined force level, and/or the driver's hands are more conductive than normal. The computational models block 14 will reflect the above conditions and provide this context to the system 24.

In operation 176, the system 10 receives the context from the computational models block 14 and refrains from providing a voice output until the stress level for the driver 24 has decreased. It is recognized that the system 10 may provide a voice output at a corresponding tone in the event the driver 24 or the vehicle 12 is detected to be in a state of potential harm.

Figures 7, 8:
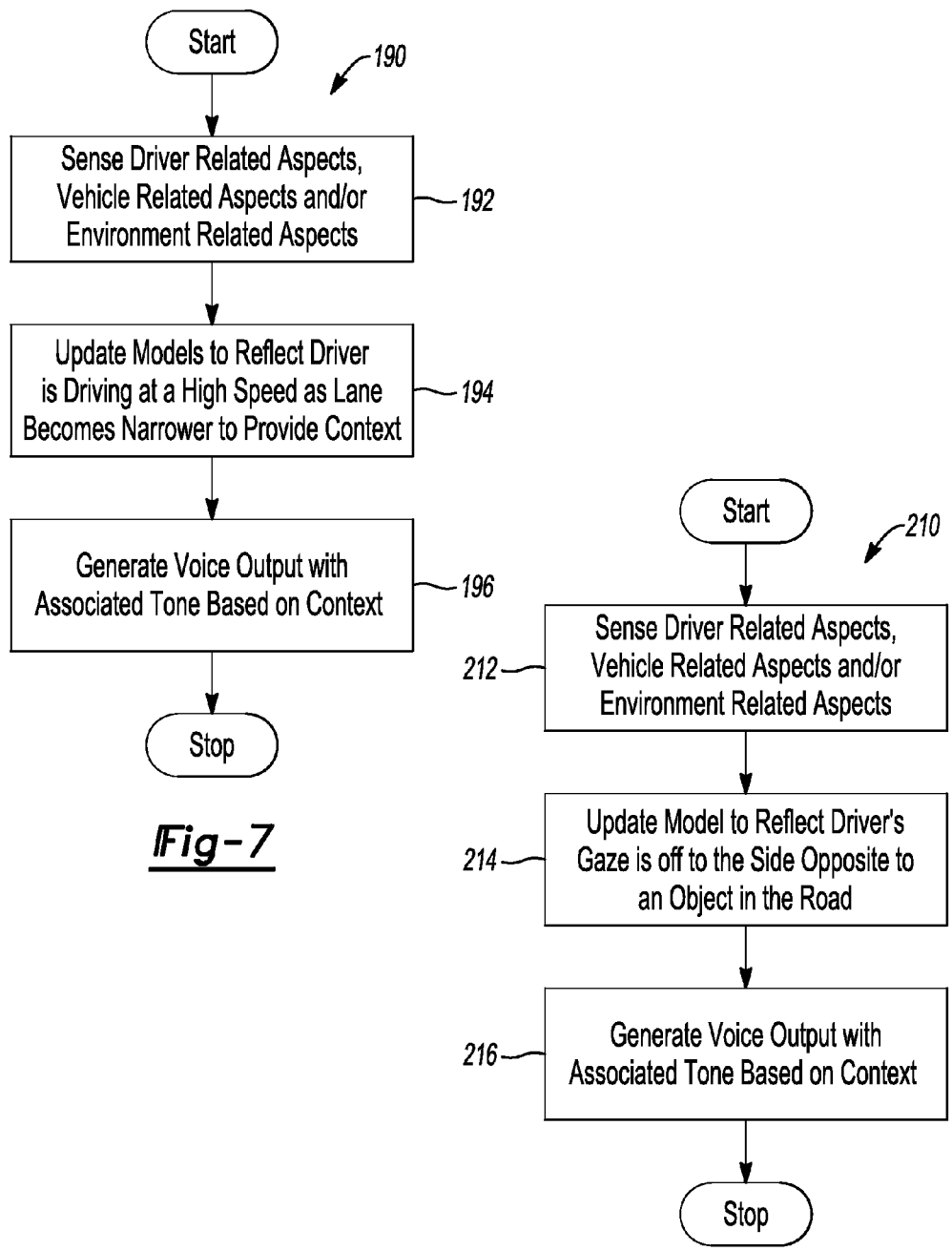
FIG. 7 depicts a fifth use case that monitors driver related aspects, vehicle related aspects and environment aspects and that generates the voice output to the driver based on monitored aspects in accordance to one embodiment to one embodiment.
FIG. 8 depicts a sixth use case that monitors driver related aspects, vehicle related aspects and environment aspects and that generates the voice output to the driver based on monitored aspects in accordance to one embodiment to one embodiment.

FIG. 7 depicts a fifth use case 190 that monitors driver related aspects, vehicle related aspects, and environment aspects and that generates the voice output to the driver 24 based on monitored aspects in accordance to one embodiment. The fifth use case 190 generally corresponds to the scenario in which the vehicle 12 is being driven at a high speed and the lane on which the vehicle 12 is being driven becomes narrower, forcing the driver 24 to pay closer attention to the his/her driving.

In operation 192, the plurality of sensors 18 monitor driver related aspects, vehicle related aspects, and/or environment aspects and the sensor processing block 16 process such information. For example, the plurality of sensors 18 (e.g., forward pointing cameras and vehicle speed sensors) detect that the width of the road decreases at a current rate of speed. Additionally the plurality of sensors 18 (e.g., temperature and grip force sensors on the steering wheel) detect that the hands 26 of the driver 24 exceed a predefined temperature and the force used by the driver 24 to grip the steering wheel exceeds a predefined force level indicating that the driver 24 is under a high cognitive load.

In operation 194, the computational models block 14 receives the processed information from the sensor processing block 16 that the lane of the road is decreasing at a high rate of speed and that the hands 26 of the driver 24 exceed the predefined temperature and the force used by the driver 24 to grip the steering wheel exceeds the predefined force level. The computational models block 14 will reflect the above conditions and provide this context to the system 10.

In operation 196, the system 10 receives the context from the computational models block 14 and refrains or withholds from providing the voice output until the driver's stress level and cognitive load on driving decrease.

FIG. 8 depicts a sixth use case 210 that monitors driver related aspects, vehicle related aspects, and/or environment aspects and that generates the voice output to the driver 24 based on monitored aspects in accordance to one embodiment. The sixth use case 210 generally corresponds to the scenario in which the driver's gaze is off to the left side of the vehicle 12 and there is an obstacle (e.g., tire debris) outside on the right side of the vehicle 12 that the driver cannot see very well.

In operation 212, the plurality of sensors 18 monitor driver related aspects, vehicle related aspects, and/or environment aspects and the sensor processing block 16 process such information. For example, the plurality of sensors 18 (e.g., IR corneal reflection sensors) monitor eye gaze of the driver 24 and (e.g., RADAR sensors) detect the obstacle to the right of the vehicle 12.

In operation 214, the computational models block 14 receives the processed information from the sensor processing block 16 that the driver's eye gaze is off to the left while an object is on the right side of the vehicle 12. The computational models block 14 will reflect the above conditions and provide this context to the system 24.

In operation 216, the system 10 receives the context from the computational models block 14 and generates the voice output in a very loud tone and lowers the volume of any music and speaks to the driver 24 with a high speech rate that there is a tire, for example, within 50 feet in front of him/her in the lane.

Figures 9, 10:
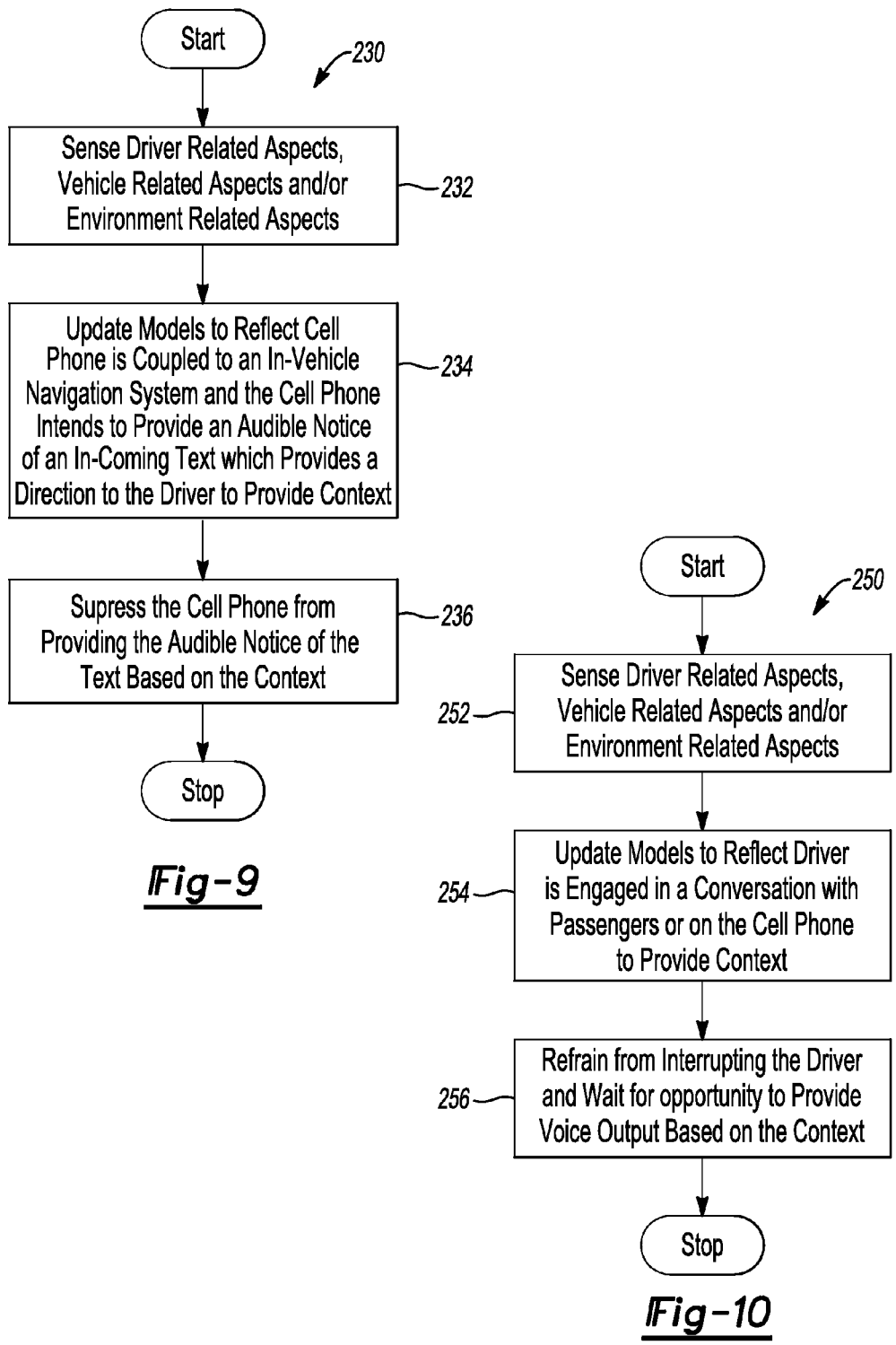
FIG. 9 depicts a seventh use case that monitors driver related aspects, vehicle related aspects and environment aspects and that generates the voice output to the driver based on monitored aspects in accordance to one embodiment to one embodiment.
FIG. 10 depicts an eight use case that monitors driver related aspects, vehicle related aspects and environment aspects and that generates the voice output to the driver based on monitored aspects in accordance to one embodiment to one embodiment.

FIG. 9 depicts a seventh use case 230 that monitors driver related aspects, vehicle related aspects, and/or environment aspects and that generates the voice output to the driver 24 based on monitored aspects in accordance to one embodiment. The seventh use case 230 generally corresponds to the scenario in which a cell phone (e.g., smart phone) is connected to an in-vehicle navigation system. The in-vehicle navigation system wants to provide the driver 24 directions, and at the same time, the cell phone is ready to provide an audible notice to the driver 24 that a text message has been received. These two systems are competing for the hearing sense of the driver since both intend on speaking to the driver.

In operation 232, the plurality of sensors 18 monitor driver related aspects, vehicle related aspects, and/or environment aspects and the sensor processing block 16 process such information. For example, the plurality of sensors 18 determine that there is a cell phone in the vehicle 12 that is ready to provide an audible notice of an incoming text message. In general, the cell phone may be operably connected to the in-vehicle navigation system to provide hands free operation of the cell phone in the vehicle 12. The cellphone is equipped with code (and hardware) that essentially provides the apparatus a heads-up or pre-alert before a spoken phrase is rendered. Further, the in-vehicle navigation system may be operably coupled to the system 10 to detect the presence of the cell phone and the in-coming text. In this scenario, the one or more of the plurality of sensors 18 are virtual. The system 10 receives a pre-alert from the phone that it wants to talk to the driver, and the system gets a pre-alert from the in-car navigation system that the in-car navigation system desires to talk to the driver 24 as well.

In operation 234, the computational models block 14 receives the processed information from the sensor processing block 16 that the cell phone would like to provide an audible notice of an in-coming text message while the in-vehicle navigation system is providing directions to the driver 24. The computational models block 14 will reflect the above conditions and provide this context to the system 24.

In operation 236, the system 10 receives the context from the computational models block 14 and suppresses the cell phone's voice system to enable the in-vehicle navigation system to provide the directions to the driver 24. The system 10 may then alert the cell phone to provide the audible notice after the in-vehicle navigation system has provided the directions to the driver 24. In general, the cellphone is configured to avoid providing an audible signal to the driver 24 unless the vehicle 12 allows the cell phone to provide the audible signal to the driver 24. This may be accomplished on an operating system level, or on the audio level. In the latter case, for example, if the cellphone wants to use the car's speakers 22 to talk to the driver, the system 10 can simply not provide control to the cellphone over the speaker 22 until the navigation system has finished using the car's speaker 22 and has released control over the car's speakers 22.

FIG. 10 depicts an eight use case 250 that monitors driver related aspects, vehicle related aspects, and/or environment aspects and that generates the voice output to the driver 24 based on monitored aspects in accordance to one embodiment. The eight use case 210 generally corresponds to the scenario in which the driver 24 is engaged in a conversation either with a passenger in the vehicle 12 or with another user via a cell phone.

In operation 252, the plurality of sensors 18 (e.g., microphone(s) in the vehicle 12, or via a message directly from the cellphone indicating that the driver is in an ongoing call) sense audio data that indicate the driver 24 is engaged in a conversation either with a passenger in the vehicle 12 or with another user via a cell phone.

In operation 254, the computational models block 14 receives the processed information from the sensor processing block 16 that the driver 24 is engaged in a conversation. The computational models block 14 will reflect the above conditions and provides this context to the system 10.

In operation 256, the system 10 receives the context from the computational models block 14 and refrains or withholds from providing the voice output to respect the turn taking of the conversation without interrupting the conversation. The system 10 effectively becomes part of the conversation due to its context awareness and understanding of politeness.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for adaptively interacting with a driver via voice interaction, the apparatus comprising:
   a computational models block configured to:
      receive driver related parameters, vehicle related parameters, and vehicle environment parameters from a plurality of sensors and employ modeling software with instructions that are executed on one or more devices to:
         generate a driver state model based on the driver related parameters,
         generate a vehicle state model based on the vehicle related parameter, and
         generate a vehicle environment state model based on the vehicle environment parameters; and
   an adaptive interactive voice system configured to:
      generate a voice output based on a driver's situation and context as indicated on information included within at least one of the driver state model, the vehicle state model, and the vehicle environment state model;
      determine, based on the information included within the at least one of the driver state model, the vehicle state model, and the vehicle environment state model, that the driver is engaged in a conversation with a person; and
      refrain from outputting the voice output while the driver is engaged in the conversation with the person to avoid interrupting the conversation.

2. The apparatus of claim 1 wherein the adaptive interactive voice system is configured to generate the voice output based on the driver's situation and context by varying a tone of the voice output based on the information included within the at least one of the driver state model, the vehicle state model, and the vehicle environment state model.

3. The apparatus of claim 1 wherein the adaptive interactive voice system is configured to refrain from generating the voice output to prevent driver distraction based on the information included within the at least one of the driver state model, the vehicle state model and the vehicle environment state model indicating that the driver is experiencing a high cognitive load.

4. The apparatus of claim 1 wherein the driver state model includes at least one of a physiological state of the driver, a cognitive load of the driver, a stress level of the driver, an alertness state of the driver, and an emotional state of the driver.

5. The apparatus of claim 1 wherein the vehicle state model includes at least one of throttle position, clutch position, transmission gear selection, brake pedal status, vehicle speed, and tire condition.

6. The apparatus of claim 1 wherein the vehicle environment state model comprises at least one of weather and objects positioned exterior to the vehicle.

7. The apparatus of claim 1 wherein the adaptive interactive system is further configured to generate the voice output to include various levels of verbosity and formality.

8. The apparatus of claim 1 wherein the plurality of sensors include at least one microphone configured to receive a voice input from a driver and to perform voice tone recognition on the voice input.

9. A computer-program product embodied in a non-transitory computer readable medium that includes instructions that, when executed by a processor, configure the processor to:
   receive driver related parameters, vehicle related parameters, and vehicle environment parameters from a plurality of sensors and employ modeling software with instructions that are executed on one or more devices to:
      generate a driver state model based on the driver related parameters,
      generate a vehicle state model based on the vehicle relate parameters, and
      generate a vehicle environment state model based on the vehicle environment parameters;
   generate a voice output based on a driver's situation and context as indicated on information included within at least one of the driver state model, the vehicle state model, and the vehicle environment state model;
   determine, based on the information included within the at least one of the driver state model, the vehicle state model, and the vehicle environment state model, that the driver is engaged in a conversation with a person; and
   refrain from outputting the voice output while the driver is engaged in the conversation with the person to avoid interrupting the conversation.

10. The computer product of claim 9 further comprising instructions to provide the voice output based on the driver's situation and context by varying a tone of the voice output based on the information included within the at least one of the driver state model, the vehicle state model, and the vehicle environment state model.

11. The computer product of claim 9 further comprising instructions to refrain from providing the voice output to prevent driver distraction in response to the information included within the at least one of the driver state model, the vehicle state model, and the vehicle environment state model indicating that the driver is experiencing a high cognitive load.

12. The computer product of claim 9 wherein the driver state model includes at least one of a physiological state of the driver, a cognitive load of the driver, a stress level of the driver, an alertness state of the driver, and an emotional state of the driver.

13. The computer product of claim 9 wherein the vehicle state model includes at least one of a throttle position, clutch position, transmission gear selection, brake pedal status, vehicle speed and tire condition.

14. The computer product of claim 9 wherein the vehicle environment state model comprises at least one of weather and objects positioned exterior to the vehicle.

15. The computer product of claim 9 further comprising instructions to provide the voice output to include various levels of verbosity and formality.

16. An apparatus for adaptively interacting with a driver via voice interaction, the apparatus comprising:
   a computational models block programmed to receive driver related parameters, vehicle related parameters, and vehicle environment parameters from a plurality of sensors and employ modeling software with instructions that are executed on one or more devices to:
      generate a driver state model based on the driver related parameters,
      generate a vehicle state model based on the vehicle relate parameters, and
      generate a vehicle environment state model based on the vehicle environment parameters; and
   an adaptive interactive voice system programmed to:
      generate a voice output based on a driver's situation and context as indicated on information included within at least one of the driver state model, the vehicle state model, and the vehicle environment state model;
      determine, based on the information included within the at least one of the driver state model, the vehicle state model, and the vehicle environment state model, that the driver is engaged in a conversation with a person; and
      refrain from outputting the voice output while the driver is engaged in the conversation with the person to avoid interrupting the conversation.

17. The apparatus of claim 16 wherein the adaptive interactive voice system is further programmed to provide a voice output based on a driver's situation and context as indicated to the information included with the at least one of the driver state model, the vehicle state model, and the vehicle environment state model.

18. The apparatus of claim 17 wherein the adaptive interactive voice system is further programmed to provide a voice output based on the driver's situation and context by varying a tone of the voice output based on the information included within the at least one of the driver state model, the vehicle state model, and the vehicle environment state model.

19. The apparatus of claim 18 wherein the driver state model includes at least one of a physiological state of the driver, a cognitive load of the driver, a stress level of the driver, an alertness state of the driver, and an emotional state of the driver.

20. The apparatus of claim 18 wherein the vehicle state model includes at least one of a throttle position, clutch position, transmission gear selection, brake pedal status, vehicle speed and tire condition.

* * * * *